Dec. 1, 1936.   R. K. LE BLOND   2,062,790
TAILSTOCK CONSTRUCTION FOR LATHES
Filed May 13, 1935   2 Sheets-Sheet 1
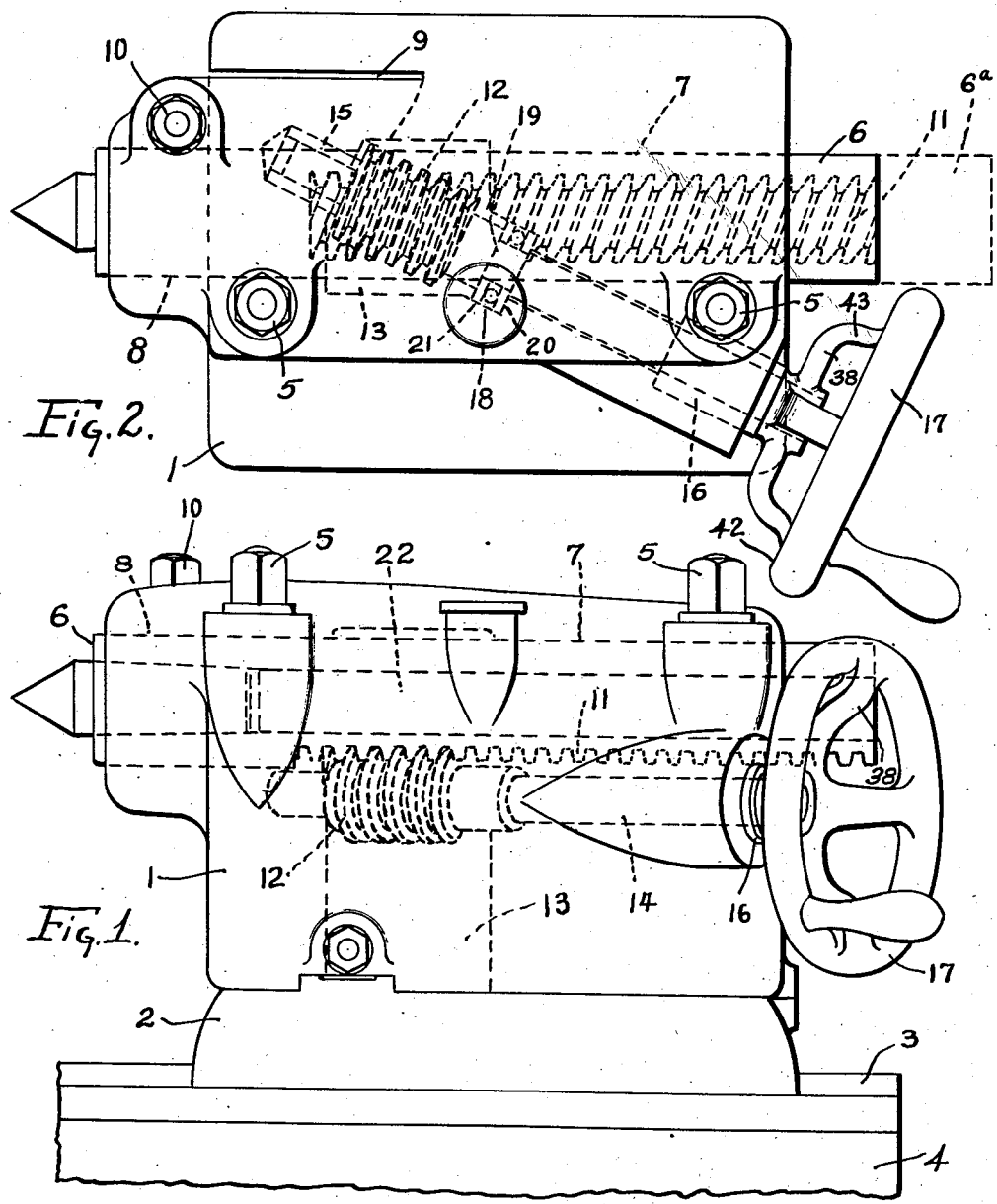

Dec. 1, 1936.　　　　　R. K. LE BLOND　　　　　2,062,790
TAILSTOCK CONSTRUCTION FOR LATHES
Filed May 13, 1935　　　　2 Sheets-Sheet 2

Inventor
Richard K. LeBlond
By Allen & Allen
Attorney

Patented Dec. 1, 1936

2,062,790

UNITED STATES PATENT OFFICE 2,062,790

TAILSTOCK CONSTRUCTION FOR LATHES

Richard K. Le Blond, Cincinnati, Ohio, assignor to The R. K. Le Blond Machine Tool Company, Cincinnati, Ohio, a corporation of Delaware Application May 13, 1935, Serial No. 21,209

2 Claims. (Cl. 82—31)

My invention relates to machine tools and is particularly directed to an improved tailstock for lathes.

It is an object of my invention to provide an improved means for axially advancing and retracting the spindle of a tailstock so as to permit a relatively large amount of axial travel while at the same time providing maximum bearing contact for the spindle in the tailstock housing during the entire length of such travel.

Another object of my invention is to provide a tailstock with a spindle having a large unobstructed hole passing through its entire length through which bar stock or the like may be inserted for machining operations.

Still another object is the provision of a novel actuating means comprising a worm carried on a shaft not coaxial with the center of the tailstock spindle which operates in a suitable rack cut in the tailstock spindle, such construction permitting more convenient location of the actuating handwheel and also allowing the tailstock spindle to pass the handwheel in its withdrawn position.

A further object is the provision of an actuating means or tailstock which is effectively self-locking as I shall hereinafter describe.

A further object is to provide a suitable spindle nose construction which is adapted for the holding of centers, drills, reamers, etc., while allowing a large unobstructed hole through the entire length of the spindle when these devices are removed.

Another object is to so construct the actuating handwheel as to allow a suitable bar or rod to be inserted between the spokes in a large number of different positions for the purpose of applying heavy pressure to the tailstock spindle for drilling, reaming, or the like, the construction being such as to allow easy insertion and removal of the bar and to prevent all possibility of slippage and subsequent injury to the operator.

These and other objects of my invention which will be set forth hereinafter or will be clear to one skilled in the art upon reading these specifications I accomplish by that certain construction and arrangement of parts of which I shall now set forth an exemplary embodiment. Reference is made to the accompanying drawings in which:

Figure 1 is a front elevation of the improved tailstock showing the novel actuating means for the spindle and showing the unobstructed hole passing completely through the spindle.

Figure 2 is a plan view further illustrating the actuating means of Figure 1.

Figure 3:
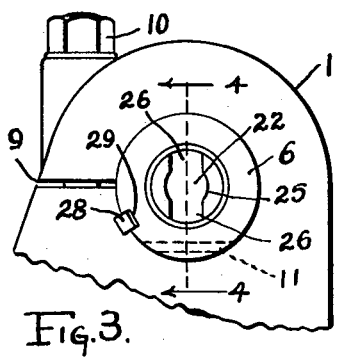
Figure 3 is a fragmentary elevation of the nose portion of the tailstock.

The main housing 1 of the tailstock is shown as carried on a base piece 2 which piece in turn rests in the ways 3 of the bed 4 of the lathe. Suitable clamping screws 5 and clamps (not shown) adjustably secure the members 1 and 2 to the bed 4 as is usual for tailstocks.

A spindle 6 is mounted in the upper part of the main housing 1 and is disposed in parallelism with the ways 3 of the bed 4 for alignment with the spindle of the headstock (not shown). Suitable bearings 7 and 8 are provided, the bearing 8 toward the headstock end being split at 9 and a clamping means 10 provided for locking the spindle 6 in a rigid position, as is also usual. On the bottom of the spindle 6 is cut a rack 11 with angular teeth, which rack may extend the entire length of the spindle 6 but is usually not cut in that part of the spindle embraced by bearing 8 when in its fully retracted position. Engaging this rack 11 is a worm 12 carried, in a pocket 13, of the housing 1, on a shaft 14. This shaft is angularly disposed relative to the axis of the spindle 6. Bearings 15 and 16 in the main body portion 1 carry the shaft 14, which shaft has attached to the end projecting from the bearing 16 an operating handwheel 17. An anti-friction thrust bearing 18, bearing between the shoulder 19 of the worm 12 and the face 20 of the bore 21 in the body 1, takes the axial thrust imposed upon the worm by the reaction of the spindle.

It can be clearly seen from Figure 2 that the angular relationship between the spindle and shaft 14 can be such as to allow the spindle to be retracted until it passes beyond the handwheel 14 and assumes such a position as that illustrated at 6a. By such an arrangement very long travel can be imparted to the tailstock spindle and also full bearing contact can be maintained at all times in bearing 7 even when the spindle is very greatly extended. A further advantage is gained by this arrangement in that the handwheel is brought forward toward the operator's side of the machine where it is more accessible and convenient to the operator. It is to be also noted that the handwheel may be located at the left hand end portion of the tailstock shown in Figures 1 and 2 without departing from the spirit of my invention. While it is not essential, it is usual in this construction so to arrange the rack 11 and worm 12 that the handwheel 17 will be revolved counter-clockwise when the spindle 6 is extended outwardly to the left, so as to keep the teeth of the rack 11 at as nearly a right angle to the axis of the spindle 6 as possible. Thus I prevent the worm 12 being driven by the rack 11 as might be the case if the rack teeth were more nearly parallel to the axis of the spindle. In this way substantially a self-locking tailstock spindle actuating means is provided; and while it will be usual when turning to lock the tailstock spindle by the means described, yet when reamers, drills or the like are to be used in the tailstock, the tailstock spindle may be advanced under great pressure without encountering heavy back pressure on the actuating device.

Figure 4:
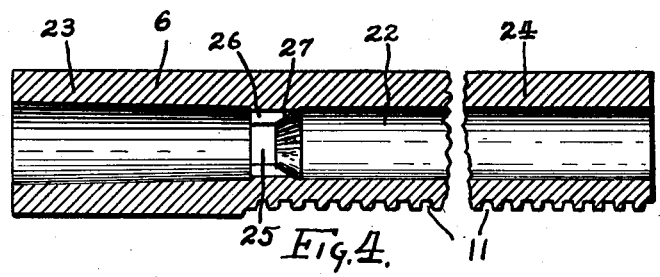
Figure 4 is a section on line 4—4 of Figure 3 showing one type of spindle bore.

By means of the arrangement above described I can provide a novel tailstock spindle, as illustrated in Figures 3, 4, 5 and 6, having an unobstructed hole or bore 22 passing axially through its entire length. In Figures 3 and 4 is illustrated one form of such spindle having the usual tapered bore 23 and a large straight bore 24. An arrangement, consisting of a boss having a hole 25 and slots 26, may be formed integral with the spindle 6 so as to provide holding means for the tang of the usual taper shanks of drills, reamers, or the like. A tapered portion 27 is formed in the boss so as to guide a knock-out rod through the hole 25 for the purpose of removing the center or drills and reamers. A key 28 secured in the housing 1 of the tailstock slidably engages a longitudinal slot 29 in the spindle 6 so as to prevent rotation of the spindle.

Figure 6:
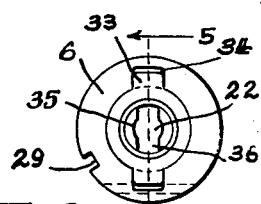
Figure 6 is an end view of the spindle shown in Figure 5.
Figure 5:
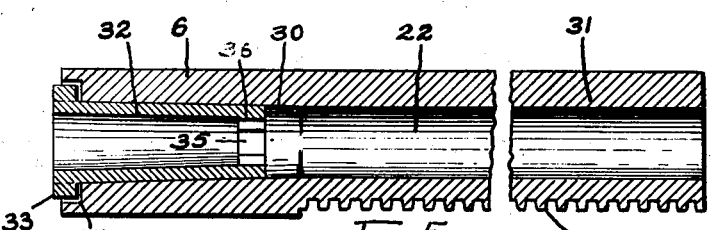
Figure 5 is a section on line 5—5 of Figure 6 showing another type of spindle bore and tool holding sleeve.
Figure 8:
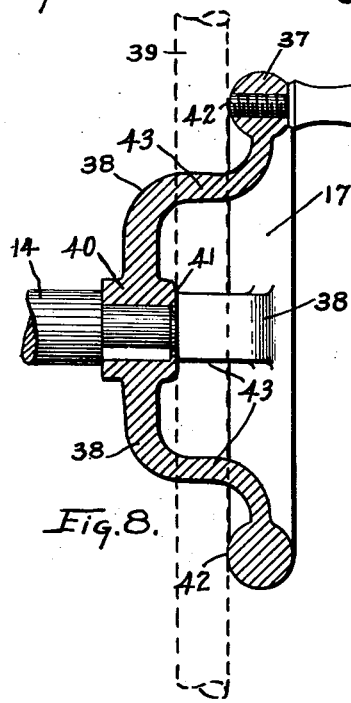
Figure 8 is a section of the handwheel on line 8—8 of Figure 7.

Another form of tailstock spindle is that shown in Figures 5 and 6 in which the bore 22 has the tapered section 30 and the large diameter straight section 31. An adaptor bushing 32 fitting in the tapered portion 30 has lugs 33 integral therewith and located diametrically opposite each other on its larger outer end, which lugs, in turn, fit in mating recesses 34 in the end of the spindle 6 so as to prevent rotation of the bushing 32 in the spindle. A hole 35 and slots 36 are provided in the rear of the bushing 32 for receiving the tang of drills, reamers, or the like, holding said tools positively against rotation when work is being done therewith. It can be clearly seen that when the bushing piece 32 is removed a much larger unobstructed hole is thus provided through the tailstock spindle.

Figure 7:
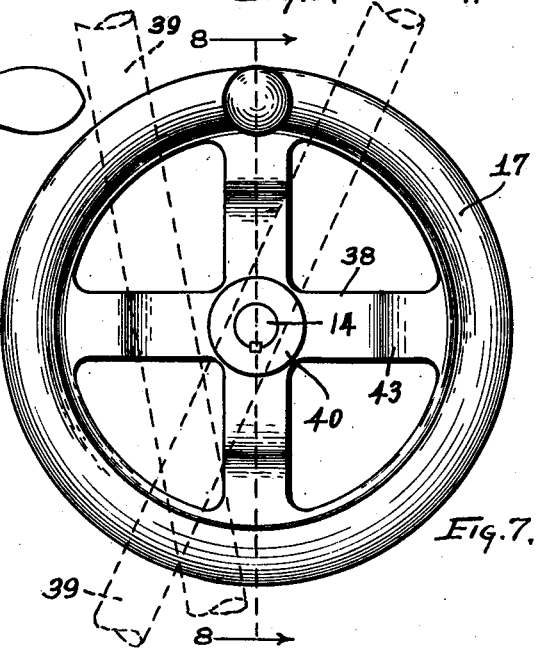
Figure 7 is a face view of the actuating handwheel.

The handwheel 17 provided for actuating the worm and rack mechanism already described is of novel construction in that the arrangement of the rim 37 and spokes 38 are such as to allow a bar or rod 39 to be inserted radially in a large number of different positions without the danger of the rod slipping and causing injury to the operator. This I accomplish by offsetting the rim 37 axially from the hub 40 sufficiently to allow a suitable bar 39 to pass between the face 41 of the hub and the edge 42 of the rim 37. It is also important to have the middle portions 43 of the spokes substantially parallel with the axis of rotation of the handwheel 17 so as to form a bearing for the rod or bar 39 which will not tend to cause the bar to slip. Figure 7 shows two of the possible positions of a bar 39 when in use to increase the leverage of the handwheel 17.

Having thus described my invention, what I claim as new and desire to secure by Letters Patent, is:—

1. A tailstock comprising a housing, a spindle mounted for axial movement in said housing, a rack on said spindle, a worm operatively engaging said rack, a worm shaft journaled in said housing in a plurality of bearings, the axis of said worm shaft being angularly disposed relative to the axis of said spindle, said worm being mounted on said shaft intermediate some of said bearings, and a handwheel connected to said worm shaft for rotating the same.

2. In a tailstock, the combination of a housing, a spindle having an unobstructed axial bore through its entire length, a rack on said spindle, a worm operatively engaging said rack, a worm shaft rotatively mounted in a plurality of bearings in said housing, said worm being mounted on said shaft intermediate some and adjacent at least one of said bearings, a handwheel connected to said worm shaft for rotating the same, the axis of the worm shaft and handwheel being angularly positioned relative to the axis of the spindle so as to allow passage of said spindle beyond said handwheel when said spindle is in its longitudinally retracted position.

RICHARD K. LE BLOND.